(12) United States Patent
Niebuhr

(10) Patent No.: US 8,204,943 B2
(45) Date of Patent: Jun. 19, 2012

(54) LARGE DISTRIBUTION MESSAGE HANDLING

(75) Inventor: Rene Niebuhr, Wiesloch (DE)

(73) Assignee: SAP AG, Walldorf (DE)

( * ) Notice: Subject to any disclaimer, the term of this patent is extended or adjusted under 35 U.S.C. 154(b) by 807 days.

(21) Appl. No.: 11/775,033

(22) Filed: Jul. 9, 2007

(65) Prior Publication Data
US 2009/0019116 A1 Jan. 15, 2009

(51) Int. Cl.
*G06F 15/16* (2006.01)
(52) U.S. Cl. .................................................... 709/206
(58) Field of Classification Search .................. 709/206
See application file for complete search history.

(56) References Cited

U.S. PATENT DOCUMENTS

| | | | |
|---|---|---|---|
| 5,644,706 A * | 7/1997 | Ruigrok et al. ................ | 714/48 |
| 6,618,748 B1 * | 9/2003 | Bates et al. ................ | 709/206 |
| 7,472,163 B1 * | 12/2008 | Ben-Yoseph et al. ......... | 709/206 |
| 2002/0007301 A1 * | 1/2002 | Reuning ........................... | 705/9 |
| 2002/0091928 A1 * | 7/2002 | Bouchard et al. ............. | 713/178 |
| 2002/0181703 A1 * | 12/2002 | Logan et al. .................... | 380/30 |
| 2003/0079160 A1 * | 4/2003 | McGee et al. .................. | 714/39 |
| 2005/0071508 A1 * | 3/2005 | Brown et al. .................. | 709/246 |
| 2005/0193069 A1 * | 9/2005 | Brown et al. .................. | 709/206 |
| 2005/0222913 A1 * | 10/2005 | Eisenberg ........................ | 705/26 |
| 2006/0101124 A1 * | 5/2006 | Landis ........................... | 709/206 |
| 2006/0195531 A1 * | 8/2006 | Braun et al. ................... | 709/206 |
| 2006/0277257 A1 * | 12/2006 | Kromann et al. ............. | 709/206 |
| 2007/0083425 A1 * | 4/2007 | Cousineau et al. ............ | 705/14 |
| 2007/0112930 A1 * | 5/2007 | Foo et al. ....................... | 709/214 |
| 2007/0180033 A1 * | 8/2007 | Singh et al. .................... | 709/206 |
| 2008/0086530 A1 * | 4/2008 | Gandhi et al. ................. | 709/206 |
| 2008/0155026 A1 * | 6/2008 | Daniels-Farrar et al. ..... | 709/206 |
| 2008/0183768 A1 * | 7/2008 | Bucher et al. ................. | 707/201 |
| 2008/0208988 A1 * | 8/2008 | Khouri et al. ................. | 709/206 |
| 2008/0256072 A1 * | 10/2008 | Logan et al. ...................... | 707/7 |

* cited by examiner

*Primary Examiner* — Firmin Backer
*Assistant Examiner* — James Edwards
(74) *Attorney, Agent, or Firm* — Mintz, Levin, Cohn, Ferris, Glovsky and Popeo, P.C.

(57) ABSTRACT

Methods and apparatus, including computer program products, for large distribution message handling. Data characterizing an intended distribution load of a message being greater than a threshold indicator may be received, a determination may be made to set a flag in response to the data; and an action may be performed in response to the flag being set. Determining a distribution load may involve determining a number of intended recipients of a distribution list, a size of a message across a number of intended recipients, and the like. Actions to be performed may include suppressing auto-replies, notifying a client, and denying distribution of a message.

9 Claims, 3 Drawing Sheets

LARGE DISTRIBUTION MESSAGE HANDLING

BACKGROUND

The present disclosure relates to data processing by digital computer, and more particularly to large distribution handling of messages.

In general, electronic mail, also referred to as e-mail, is handled by an exchange system that routes electronic mail messages to message boxes of recipients. Many exchange systems for enterprises are set up in a client/server fashion, where a server dispatches message on behalf of client that may be used to compose or view messages. Intended recipients of a message may be batched into a dispatcher list, which may be referred to as a distribution list. A number of recipients in a distribution list may be unknown, as the recipients may be attached at a message server.

SUMMARY

The subject matter disclosed herein provides methods and apparatus, including computer program products, that implement techniques related to large distribution message handling.

In one aspect, a message with a flag characterizing the message as being intended to have a distribution load greater than a threshold indicator may be received, a determination may be made that the flag has been set; and an action may be performed in response to determining the flag is set.

In another aspect, data characterizing an intended distribution load of a message being greater than a threshold indicator may be received, a determination may be made to set a flag in response to the data; and an action may be performed in response to the flag being set.

In another aspect, data characterizing an intended distribution load of a message being greater than a threshold indicator may be received and an action may be performed based on the data.

In another aspect, data characterizing an intended distribution load of a message being greater than a threshold indicator may be received, a determination may be made as to whether to set a flag in response to the data characterizing the intended load as being greater than a threshold indicator; and an action may be performed if the flag is set.

In another aspect, a message with a flag may be received at a message server, where the flag characterizes the message as being intended to be sent to a distribution list having distribution greater than a threshold number of recipients; the message server may determine the flag has been set; and an action may be performed in response to determining the flag is set.

In another aspect, data characterizing a message as being intended to be sent to a distribution list having distribution greater than a threshold number of recipients may be received, the data may be incorporated into the message, and the message may be caused to be transmitted to a message server. The message server may process the data to perform an action based on the message incorporating the data.

The subject matter may be implemented as, for example, computer program products (e.g., as source code or compiled code), computer-implemented methods, and systems.

Variations may include one or more of the following features.

The threshold indicator may be a threshold number of intended recipients, a threshold data volume, a combination of the two, or another threshold metric (e.g., a metric related to a processing load imposed on a message server).

A determination may be made as to whether to set the flag. The flag may be referred to as a mass distribution flag. Determining whether to set the flag may include determining whether an intended distribution of the message is greater than a threshold indicator being a threshold number of recipients.

A determination to set a flag may be made at a client (e.g., message client), server, message box, or any combination.

Actions that may be performed may include suppressing auto-reply in response to receipt of a message, denying distribution of a message, notifying a client of a determination to set a flag (e.g., a message indicating that "the current distribution list will cause a mass distribution flag to be set, which may alter processing"), batch processing of a message (e.g., only sending a message to fifty recipients every minute), sending a message to a limited amount of intended recipients (e.g., sending a message to a first fifty persons on a distribution list), or a combination of actions may be performed.

A flag may indicate a message is to be evaluated at a client-side message server to determine whether the message requires special processing based on a load imposed by a distribution list, a collection of intended recipients, or a combination of the two.

A threshold number of recipients may be subjectively defined by a user.

A flag may be set by a user (e.g., a user composing a message may set a mass distribution flag to alter processing of a message; e.g., even if the flag might not be set at a server; e.g., a user might not wish to receive auto-replies to a message sent to a distribution list).

An interface to configure a definition of a distribution load, a threshold, actions to performed, or a combination of features may be provided (e.g., a user interface at a message client, message server, or both).

The subject matter described herein can be implemented to realize one or more of the following advantages.

If an intended distribution load of a message is above a threshold (e.g., a distribution list or a data load of a distribution is larger than a threshold), actions may performed that may result in a reduced load on a message server. For example, a user may be notified of that the threshold has been passed (e.g., a number of recipients of a distribution list may be sent to a user) and a user may decide to cancel sending a message, revise an intended distribution of a message, or revise a size of a message (e.g., by removing clip-art or reducing a size of attachments). As another example, auto-replies may be disabled or suppressed such that, for example, a vast number of auto-replies are not generated in response to a single message (e.g., a message server might not send any auto-replies in response to a message, a message server may deny dispatch requests from message boxes, message boxes might not cause an auto-reply to be generated, and the like). As another example, distribution of a message may be batch-processed over time to distribute the distribution load, distribution of a message may be denied, or distribution of a message may be reduced (e.g., a message may be sent to only a first one hundred intended recipients). The actions may improve stability of a message exchange infrastructure by avoiding an overload of a network. Expansion of distribution lists may be controlled (e.g., by limiting an amount of intended recipients or denying requests to dispatch messages to oversized distribution lists). Control may be provided over a number of addressed receivers after a message was sent. A configuration mechanism may allow for a definition of a distribution load, thresholds, or both to be tweaked to optimize performance. Feedback may be provided to a message client.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
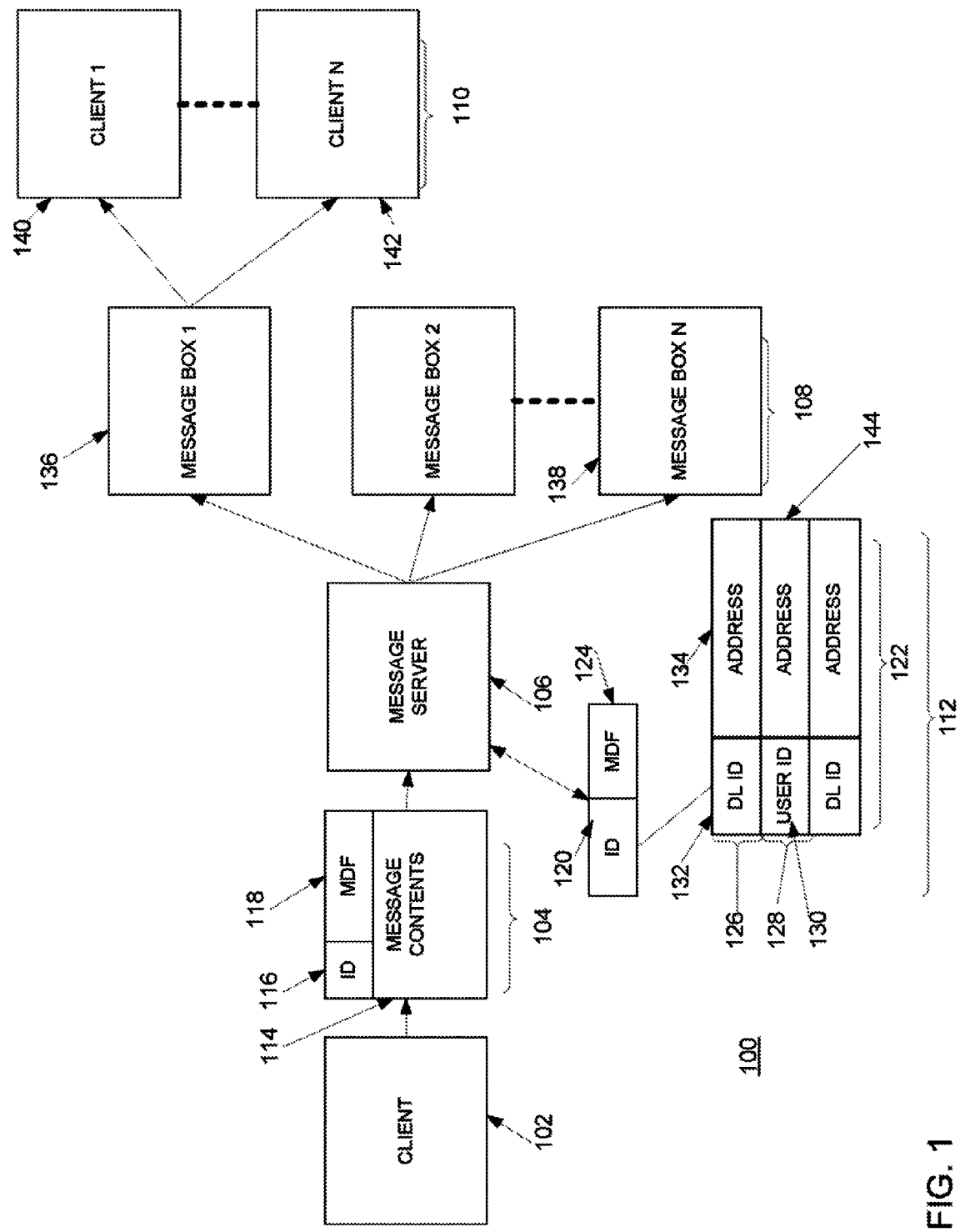
FIG. 1 is a diagram of a messaging landscape for messages including a mass distribution flag.

FIG. 1 is a diagram of a messaging landscape 100 for messages including a mass distribution flag. In general, a message 104 may be sent from a client 102 to a message server 106 and the message 104 may include a mass distribution flag 118 (which may be set), and an identifier 116 of a distribution list to which the message is intended to be sent. The message server 106 may determine which of the message boxes 108 correspond to the distribution list specified in the message 104 and the message may be left in those message boxes. A user of one of the clients 110 may read, compose, and otherwise manage messages in a message box 136.

In general, the mass distribution flag 118 indicates whether the message 104 is intended to be sent to a large distribution and the flag 118 may be used to cause an action to be performed (e.g., influence one or more behaviors related to handling of the message 104). Whether the mass distribution flag 118 is to be set may depend on a number of intended recipients, an existence of attachments, a size of attachments, and the like, or a combination of factors. For example, the mass distribution flag 118 may be set if any of the distribution lists that are intended recipients has an associated mass distribution flag set. As another example, the mass distribution flag 118 may be set if a combined load of attachments across intended recipients is above a threshold number of megabytes (e.g., if a threshold is fifty megabytes, sending a ten megabyte electronic message to six recipients may be above the threshold).

Whether the mass distribution flag 118 is to be set may be determined at one or more times during the generation and processing of a message. For example, a distribution list 112 may be pre-defined as having an associated mass distribution flag 124 such that use of the distribution list in a message is to reflect whether the associated mass distribution flag 124 is set. For example, a distribution list 112 may have an associated mass distribution flag 124 that indicates the distribution list is determined to be a distribution list having a large distribution. In that case, the determination of whether a distribution list has a large distribution list may be determined when a distribution list is generated or managed (e.g., by a user of the server 106 having access rights to manage distribution lists; e.g., by determining whether a number of recipients in the distribution list is above a threshold). Then, when the message 104 is populated with an identifier 116 of a distribution list matching the identifier 122 of the distribution list 120 having a mass distribution flag 124 being set, the client 102 may ping the server 106 to determine if the mass distribution flag 124 is set and the client may set the mass distribution flag 118 of the message 104 to reflect the mass distribution flag 124 of the server 106 being set.

As other examples, whether the mass distribution flag 118 of a message is to be set (e.g., whether a distribution list is sufficiently large or otherwise influencing the setting of the mass distribution flag 118) may be determined when a message is composed, when the message 104 is received at the message server 106, or at a combination of events (e.g., there may be several instances where a determination is made as to whether the flag 118 is to be set or reset). For example, a distribution list may be expanded when the client 102 inputs the distribution list and a determination may be made as to whether the expanded list is above a threshold number of recipients (e.g., by the client 102 or server 106). If the number is above a threshold, the mass distribution flag 118 may be set.

Determining whether the mass distribution flag 118 of the message 104 is to be set may be determined by the message client 102, the message server 106, or both, and setting the mass distribution flag 118 may be performed by either or both. For example, a process to determine whether a message has a large, intended distribution may include sending a request to the message server 106 to determine whether one intended recipient or a collection of intended recipients constitutes a large distribution such that the mass distribution flag 118 of a message should be set (e.g., the server 106 may expand distribution lists, including nested distribution lists and determine whether a collective number of intended recipients are above a pre-determined threshold number). The server 106 may respond and the client 102 may set the flag if the server 106 indicates the flag 118 is to be set.

The mass distribution flag 118 may cause one or more actions to be performed. The actions may be performed if the mass distribution flag 118 has been set. The actions may be performed at the client 102, the message server 106, the message boxes 136, the clients 110, or any combination. Actions that are performed may include modifying an intended list of recipients (e.g., removing recipients such that a message is only sent to a limited number of recipients, e.g., a first twenty intended recipients), suppressing automatic reply messages that may be sent in response to a message, refusing to send a message, notifying a client (e.g., notifying a client of a mass distribution flag being set, of an intended number of recipients, of a possible data load on a system from attachments, and the like; e.g., before a client is to send a message such that a client may change a message to, for example, avoid the mass distribution flag 118 from being set), requesting a confirmation from a user of the client 102 whether to proceed to send the message 104, and the like. A combination of actions may be performed. For example, the client 102 may ask a user to confirm to send the message 104 to a large distribution, the server 106 may only send the message 104 to a first five hundred intended recipients (e.g., a first five hundred message boxes), and users of message boxes may have automatic replies for their message box or client suppressed (e.g., out-of-office auto-replies may be disabled such that several hundred out-of-office auto-replies do not burden the server 106, the client 102, or both).

In some implementations, a message server, such as the message server 106, may have a configuration of parameters that determine an action or actions performed at the message server and that configuration may be changed by an administrator of the message server. As different organizations or scenarios may desire different thresholds or actions to be performed, such configuration may assist flexible implementation or deployment of such a message server. Examples of configurable parameters may include rules for determining whether to set a mass distribution flag (e.g., a parameter for a threshold number of intended recipients above which a mass distribution flag may be set), actions to perform in response to a mass distribution flag being set, and the like. Configuration related to determining whether a message flag is to be set, actions to be performed in response to a message flag being set, or both may be limited to configuration of parameters at a message server. For example, the message server 106 may have a threshold number of recipients for which a message flag is to be set and a configuration of actions to perform in response to the message flag being set, and, no configuration may be made at a client.

The client 102 and clients 110 are messaging clients that operate in a client/server relationship with the message server 106. For example, a message client may be MICROSOFT CORPORATION'S MICROSOFT OUTLOOK and a message server may be MICROSOFT CORPORATION'S MICROSOFT EXCHANGE SERVER. The message server 106 sends messages on behalf of the clients 102, 110 that may be sent to message boxes 108 of the clients 102, 110 of the message server 106 or another message server which may have other message boxes and message clients (e.g., to an electronic mail address of another host). Messages at the message boxes 108 may be retrieved by the clients 102, 110 for viewing and management. Each of the message boxes 108 may be associated with one or more electronic mailing addresses such that messages may be addressed to a message box based on an address. The clients 102, 110 may have access to the message boxes over a network and messages may be stored at the message boxes 108, clients 102, 110, or both. The message server 106 may be referred to as a client-side message server as the message server 106 provides message services for message clients (e.g., in contrast to a message server that routes messages among message servers).

The message server 106 may have an interface to assist configuring message handling. For example, an administrator of the message server 106 may use an interface to associate a mass distribution flag with specific distribution lists. As another example, an administrator of the message server 106 may have an interface for configuring actions that may be performed if a mass distribution flag is set (e.g., deny sending a message, only send a message to a first number of recipients, suppress automatic replies, batch processing of messages (e.g., sending batches of messages over intervals of time; e.g., ten messages every minute to distribute the message handling load), and the like). As another example, an administrator of the message server 106 may have an interface for configuring criteria for setting a mass distribution flag (e.g., a number of users, an expected data volume, and the like). A configuration may be referenced to determine whether a mass distribution flag is to be set, how to respond to a message having a mass distribution flag being set, or both.

The message 104 includes an identifier 116 of a distribution list, the mass distribution flag 118, and message contents 114. The identifier 116 identifies a distribution list that is an intended recipient of the message 104. Although the message 104 has a single identifier of a distribution list, a message may support multiple identifiers for multiple distribution lists, and other identifying information may be used to identify individual message boxes. For example, the message 104 may be addressed to two distribution lists identified by the identifier 116 and another identifier (not shown), and several electronic mail addresses identifying other message boxes. The mass distribution flag 118 is associated with the message 104 such that the message 104 has one flag that may collectively represent all intended recipients of the message 104 (e.g., if there are multiple distribution lists). In some implementations, a mass distribution flag may correspond to each distribution list such that a message may have multiple mass distribution flags, with one for each distribution list. The message contents 114 may include a message header and message body.

The distribution list 112 may be one of several distribution lists managed by or referenced by the message server 106. The distribution list has an identifier 120 that identifies the distribution list in relation to other distribution lists (e.g., the identifier 120 may be a unique identifier having a text-based name (e.g., "All-Offices-All-Employees") that may be descriptive of the addresses associated with the distribution list). The distribution list 112 may be stored at the message server 106 or another location. The distribution list 112 may be stored in a binary format, where, for example, a distribution list has a unique identifier and receivers are linked to the distribution list.

The distribution list may be linked to user identities and other distribution list identifiers, such that distribution lists may be nested. For example, the distribution list 112 is linked to a list 122 of distribution list identifiers and user identifiers that are associated with addresses. For example, the first member 126 of the list 122 has a distribution list identifier 132 and associated address 134 that identifies a nested distribution list. As another example, the second member 128 of the distribution list includes a user identifier 130 and associated address 144.

Although FIG. 1 has a certain number and type of features, additional, fewer, or different features may be in the messaging landscape 100. For example, although FIG. 1 shows a single server 106 that may be used to dispatch messages on behalf of clients 102, 110, any number of servers may be used and they may be grouped hierarchically. Although the term "mass distribution flag" is used to determine the flag of a message that may cause actions to be performed, another term may be used and the flag need not reflect a mass distribution. For example, a flag that indicates a large attachment load might be generated may be referred to as a large load flag. As another example, a flag may only be included in a message that is indicated as having large distribution, such that, for example, a system might not include a flag in messages not having a large distribution (e.g., intended to have many recipients or intended to have a large load).

Figure 2:
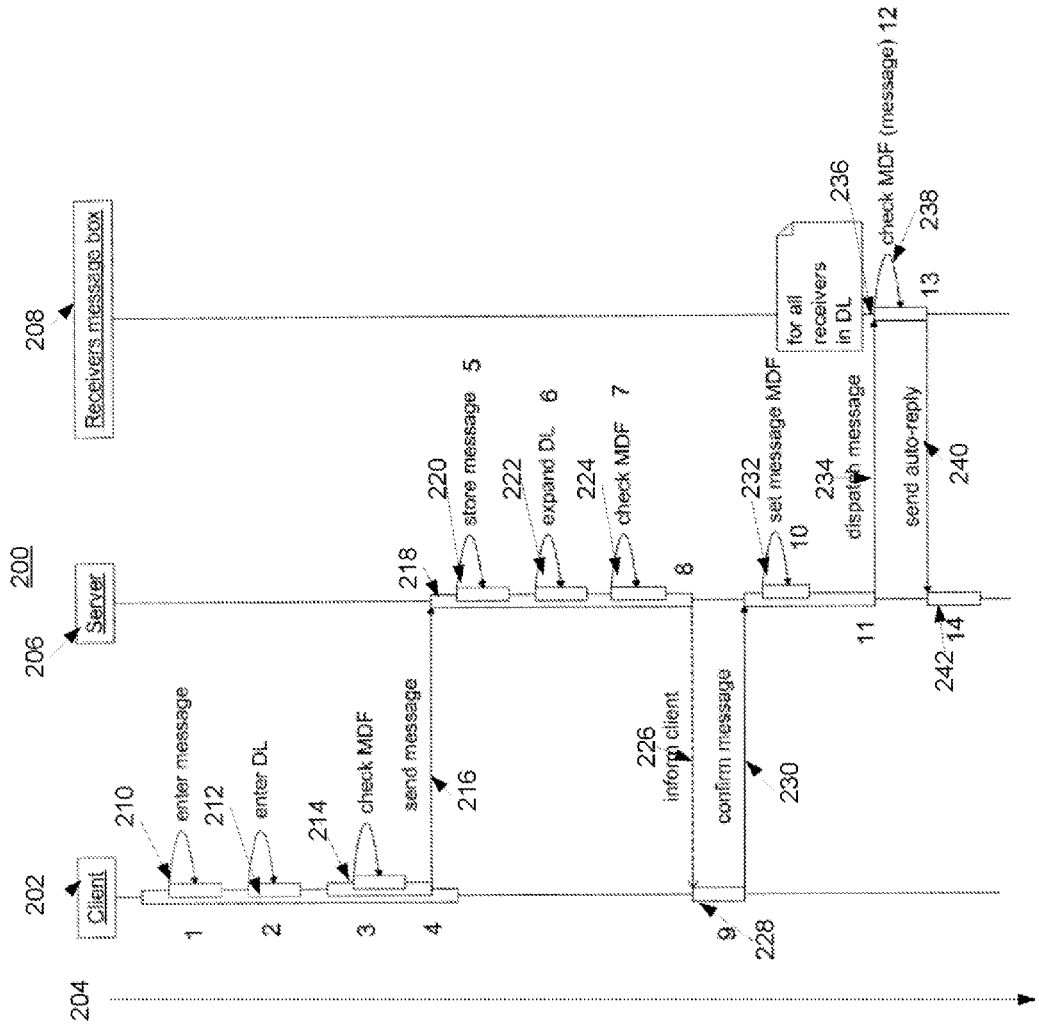
FIG. 2 is a block diagram illustrating actions performed across a messaging landscape for messages including a mass distribution flag.

FIG. 2 is a block diagram illustrating actions performed across a messaging landscape 200 for messages including a mass distribution flag. The timing of actions in relation to each other is shown across a time axis 204. In general, the messaging landscape includes a client 202, a server 206, and receiver message boxes 208. The messaging landscape 200 of FIG. 2 may include elements of the messaging landscape 100 of FIG. 1. For example, the client 202, the server 206, and the receiver message boxes 208 of FIG. 2 may be the client 102, the message server 106, and the message boxes 108 of FIG. 1. In general, a message is sent from the client 202 to the server 206 which may be sent to one or more of the receiver message boxes 208. Depending on whether a mass distribution flag is to be set, different actions may be performed. For example, an auto-reply message may only be sent if a mass distribution flag is not set (240).

A message is generated at the client (210). Generating a message, such as an electronic mail message may involve a user composing an electronic message. A user may input a distribution list (212) as an intended recipient of a message. The distribution list may have an alias that is understood by the server 206 which may be used to associate a name of a distribution list with a list of recipients. Members of a distribution list may include aliases, electronic mail addresses, and other distribution lists. In general, an alias may be a name of a recipient that is associated with one or more recipients at the server 206. For example, a distribution list may have an alias "Engineers" which associates a list of electronic mail addresses with the alias such that, when the server 206 is to send the message, the server 206 posts the messages to message boxes of the electronic mail addresses.

At the client 202 a check may be made for whether a mass distribution flag is to be set (214). The check may involve sending the message (216) to the server 206, which may determine if a distribution list of the message generated at the client is to be associated with a mass distribution flag. For example, in response to receiving the message (218), the message may be stored at the server 206 (220), the server 206 may expand the distribution list (222; e.g., expanding a distribution list to determine all members of the distribution list, which may include expanding nested distribution lists), and a determination as to whether a mass distribution flag is to be set may be made (224). Determining whether a mass distribution flag is to be set at the server 206 (224) may involve determining whether an amount of recipients in the expanded distribution list is above a threshold number. For example, a mass distribution flag may be set if the expanded distribution list has over 500 members. As another example, determining whether a mass distribution flag is to be set (224) may involve determining whether an expected data volume is above a threshold (e.g., whether a message times a number of recipients is above a threshold amount of data). Any combination of techniques may be used to determine whether to set a mass distribution flag.

If the mass distribution flag is to be set, a notification message may be sent to a client 202 to request confirmation to send the message (226), the client 202 may receive the notification (228), and a user of the client 202 may confirm to send the message, which may result in a confirmation message being sent to the server 206 (230). If a user of the client 202 decides not to send a message, the client 202 might not confirm to send the message and the message might not be sent. And, for example, a user may edit the message such that a mass distribution flag is not set (e.g., removing pictures in a message to reduce the size of the message or reducing an amount of intended recipients). As expansion of distribution lists to their members may happen after a message has been posted to a message server (e.g., such that a list may expand to a different number based on users associated with distribution list at different times), a user generating a message might not realize the size of a distribution list or a collection of intended recipients, such that feedback (e.g., in the form of a request to confirm or cancel delivery of a message having a large distribution load) to a client may be helpful.

In response to receiving the confirmation, the server 206 may set the mass distribution flag of the message (232) and send the message to message boxes 208 of intended recipients (234). In response to receiving the message (236), a check may be made at message boxes 208 to determine whether the mass distribution flag is set (238). If the mass distribution flag is set, auto-reply messages may be suppressed at the message boxes 208. Otherwise, auto-reply messages may be sent (240) and received at the server 206 (242).

Although FIG. 2 includes a certain number and type of actions, additional, fewer, or different actions may be performed across the messaging landscape 200. For example, a determination for whether a mass distribution flag is to be set may occur at additional, different, or fewer instances. For example, a determination may be made when a distribution list is entered in a message, before a message is sent (e.g., the client 202 may make the determination or the client 22 may send a request to determine whether to set the mass distribution flag to the server 206). As another example, in response to a mass distribution flag being set, the server 206 may send messages in batches over a period of time (e.g., sending the message to five recipients every minute) or may only send the message to a first hundred intended recipients. As another example, if a mass distribution flag is to be set, the server 206 may deny a request to dispatch the message.

Although FIG. 2 indicates a certain timing of actions across the time axis 204, timing may vary. For example, actions may be performed in parallel. For example, a message may be stored at the server 206 (220) and a distribution list may be expanded (222) in parallel. As another example, the server 206 may receive a request to determine whether to set a mass distribution flag in response to a distribution list being entered in a message and before the message is sent to the server 206.

Figure 3:
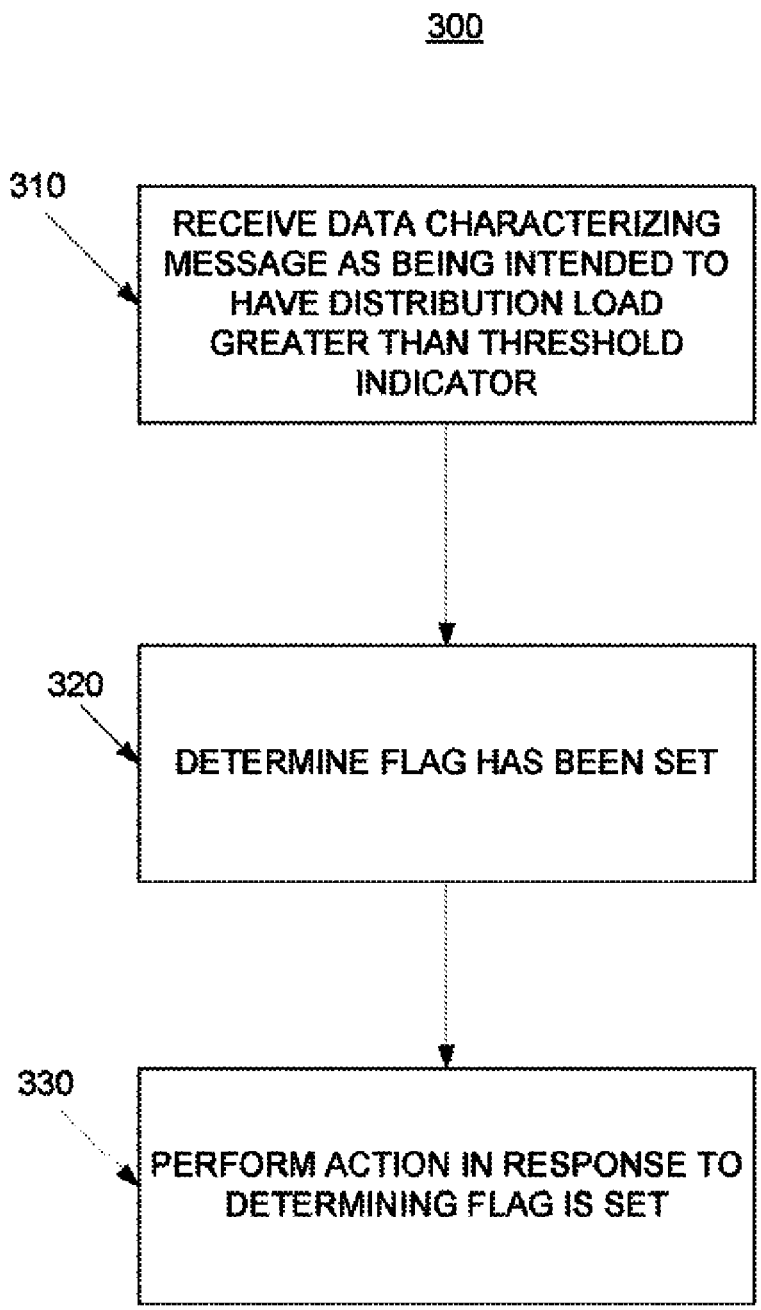
FIG. 3 is a flowchart illustrating a process of handling a message that may have a flag for large distribution set.

FIG. 3 is a flowchart illustrating a process 300 of handling a message that may have a flag for large distribution set. In general, data characterizing a message as being intended to have a distribution load greater than a threshold indicator is received (310), a determination is made as to whether a flag has been set (320), and an action is performed in response to determining the flag is set (330). The process 300 may be performed in a messaging landscape, such as the messaging landscape 100 of FIG. 1 or the messaging landscape 200 of FIG. 2.

The operations may be performed by a sending message client, a message server, at a message box, at a recipient message client, or any combination. For example, a message with a message flag may be received at a message server, a determination as to whether the flag has been set may be made at the server, and the server may suppress auto-replies. As another example, a flag may be received at a sending message client in response to a dispatch request from the message client, the message client may determine the flag has been set, and the message client may prevent the message from being sent.

Data characterizing a message as being intended to have a distribution load greater than a threshold indicator is received (310). The data may be represented differently in different implementations. For example, an indication of a distribution list being above a threshold may be sent from a message server to a client and the client may set a flag. As another example, the data may be a flag, which may have different implementations and may be included in a message. For example, in some implementations a flag may be a property where a value of one indicates the flag is set and a value of zero indicates the flag is not set. As another example, a flag may only be included in a message if the flag is set (e.g., a lack of a flag may indicate a message does not have an intended distribution above a threshold indicator). A distribution load may be a number of intended recipients of a distribution list, a number of intended recipients of a message (e.g., based on a collection of distribution lists and individually identified intended recipients), a size load of a message, a size load of a message across a number of intended recipients, an attachment load of a message, an attachment load of a message across a number of recipients, and the like. A threshold may be pre-defined for a message system. A threshold may be configurable. A threshold may vary across components of a messaging landscape (e.g., a message server may have a threshold different from a message client and they may have different metrics for measuring a distribution load).

A flag may be set by one or more components in a messaging landscape. For example, both a message client and a message server may determine whether to set a flag. In some implementations, a flag may be set by a user (e.g., if a user desires to change how a message is handled by a messaging landscape).

A determination is made as to whether the flag has been set (320). The determination may involve checking a value of a flag or checking the existence of a flag of a message.

An action is performed in response to determining the flag is set (330). The action may include a combination of one or more of suppressing auto-replies, refusing to send a message, sending a message to a limited number of intended recipients, batch processing of sending messages over a period of time, notifying a client of a distribution load, requesting a confirmation from a user to send a message have a message with an associated flag set, and the like.

Although FIGS. 1-3 discuss messages that may be electronic mail messages, similar techniques, mechanisms, or both may be applied for other types of messages, such as Short Messaging Service messages, Multimedia Messaging Service messages, application to application messages, and the like.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:
1. A computer program product non-transitorily embodied in a machine-readable storage device and being operable to cause a data processing apparatus to perform operations comprising:
   receiving, by a message server from a message client, a message for transmission to a plurality of message recipients, the message including:
     at least one identifier of at least one distribution list containing one or more of the plurality of message recipients to whom the message is intended to be sent,
     a mass distribution flag characterizing the message as being intended to have a distribution load greater than a threshold indicator, and
     contents of the message,
   the distribution load being calculated as being equivalent to a size of the message multiplied by a number of recipients on the distribution list;

determining, by the message server, that the mass distribution flag of the message has been set to indicate that the message has a distribution load greater than a threshold indicator; and initiating, by the message server in response to determining that the mass distribution flag has been set, delivery of the message to one or more message boxes associated with one or more of the plurality of message recipients of the at least one distribution list in batches, each batch comprising a pre-defined number of the message recipients and being initiated in pre-defined intervals;

receiving, at the message boxes, the message;

determining, by the message boxes, that the mass distribution flag is set; and suppressing, by the message boxes, auto-reply messages that would have otherwise been sent in response to receiving the message.

2. The product of claim 1, wherein the operations further comprise:
determining whether to set the flag at the message server.

3. The product of claim 1, wherein the operations further comprise:
determining whether to set the flag at the message client.

4. The product of claim 1, wherein the operations further comprise:
denying distribution of the message.

5. The product of claim 1, wherein the performing the action comprises:
notifying a client the flag is set.

6. The product of claim 1, wherein the operations further comprise:
providing an interface to configure a definition of the distribution load, the threshold, or both.

7. A computer-implemented method for implementation by a messaging landscape including a message client and a message server, the method comprising:

receiving, by a message server from a message client, a message for transmission to a plurality of message recipients contained on at least one distribution list, the message including a mass distribution flag characterizing the message as being intended to be delivered to one or more of the plurality of message recipients on the at least one distribution list, the at least one distribution list having an associated mass distribution flag set;

determining, by the message server, that the mass distribution flag of the message has been set to indicate that the message has a distribution load greater than a threshold indicator; and initiating, by the message server in response to determining that the mass distribution flag of the message has been set, delivery of the message to one or more message boxes associated with one or more of the plurality of message recipients of the at least one distribution list in batches, each batch comprising a pre-defined number of recipients and being initiated in pre-defined intervals;

receiving, at the message boxes, the message;

determining, by the message boxes, that the mass distribution flag is set; and suppressing, by the message boxes, auto-reply messages that would have otherwise been sent in response to receiving the message.

8. The method of claim 7, further comprising:
providing an interface to configure a definition of the distribution load, the threshold, or both.

9. A method for implementation among a messaging landscape including a client, a server, and receiver message boxes, the method comprising:

generating, at the client, a message for distribution to a distribution list;

checking, by the client, whether a mass distribution flag should be set for the message, the checking comprising:
sending, by the client to the server, the message,
storing, by the server, the message,
expanding, by the server, the distribution list to determine all members of the distribution list,
determining, at the server, that the mass distribution flag should be set for the message, the mass distribution flag characterizing that the message has an intended distribution load greater than a threshold indicator, and
returning, by the server to the client, a notification message requesting confirmation to send the message;

receiving user-generated input confirming transmission of the message in response to receiving the notification message;

setting, by the server, the mass distribution flag for the message;

sending, by the server, the message to message boxes of the members of the distribution list;

receiving, at the message boxes, the message;

determining, by the message boxes, that the mass distribution flag is set; and suppressing, by the message boxes, auto-reply messages that would have otherwise been sent in response to receiving the message.

\* \* \* \* \*